United States Patent Office 3,006,716
Patented Oct. 31, 1961

3,006,716
CORROSION PREVENTION WITH POLYAMINE-CARBOXYLIC ACID PRODUCT IN BLACK LIQUOR EVAPORATION PROCESS
Otto L. Hudrlik, Portland, Oreg., assignor to Nalco Chemical Company, a corporation of Delaware
No Drawing. Filed Dec. 17, 1958, Ser. No. 780,919
12 Claims. (Cl. 21—2.5)

This invention relates to a method for rendering the acidic vapor produced by the evaporation of black liquor substantially non-corrosive to metal surfaces commonly in contact with such vapor. Specifically, the invention deals with the prevention of corrosion occasioned by condensate vapors which have substantial quantities of dissolved acidic components and hydrocarbons by adding to such vapors a corrosion-inhibiting composition.

In the production of kraft paper by the so-called sulfate process, the bark and chipped wood are treated with an alkaline aqueous liquid to remove the organic contaminants from the wood, of which lignin is the chief component. In a typical process, the chips are cooked in a 10% solution of sodium hydroxide which contains about 20 mole percent of sodium sulfide. The reaction is usually conducted at temperatures of approximately 170°–180° C. for a period of time ranging between one and three hours.

The resultant organic residues are removed from the chips by washing, which wash water contains dissolved lignin, emulsified soaps, other organic ingredients, and substantial amounts of inorganic salts and bases. This wash water is commonly referred to as black liquor.

It is common practice in large mills to recover the inorganic components of the liquor and to use the organic portion as fuel. As produced, the black liquor will usually contain about 12% by weight of solid material. Before the liquor can be used as fuel and the inorganic components recovered, it is necessary that the material be concentrated, usually to a solids content of about 45% by weight. The concentration of black liquor is usually conducted in multiple-effect evaporators.

These evaporators are ordinarily operated by employing the steam produced in the highest pressure evaporators to heat the next highest pressure evaporator. The flow of liquor is countercurrent to the flow of pressure and steam. In evaporators containing black liquor of the lowest solids concentration, the steam used usually produces a vacuum in the system. As a general rule, the first few stages of the evaporating system will produce large quantities of acidic vapors since the most volatile materials tend to be more easily removed either by the action of direct distillation or by steam distillation.

The vapors produced in the first stages of evaporation are extremely corrosive since they contain substantial amounts of such acidic materials as carbon dioxide, carbon monoxide, hydrogen sulfide, low molecular weight mercaptans, and a small portion of volatile components such as turpentine and the like.

The resultant vapors, when condensed on such metal surfaces as condensers, steam tubes, and the surfaces of the evaporator, tend to be even more corrosive than condensate of the type produced by the boiling of softened or demineralized water. It has been the experience of plant operators that these acidic vapors, particularly those produced in the early concentration stages, will form scale and corrosion products which greatly impair the efficiency of the unit. Various attempts have been made to use chemical inhibitors in an attempt to mitigate this problem, but by and large they have not been particularly successful. Prior art inhibitors, such as ammonia, lower alkyl-substituted mono-amines, and the like, have proven to be of little or no effect in alleviating the problems described above.

In accordance with the invention, it has been found that the acidic vapors produced by the evaporation of water from black liquor may be rendered substantially non-corrosive by treating such vapors with corrosion-inhibiting amounts of a water-dispersible reaction product of a low molecular weight alkylene oxide and a substituted alkylene diamine. These materials are effective when added to the steam lines or to the vapor phase above the black liquor. Generally, however, it is preferred to add the treatment to the steam lines since the smallest amounts of the treatment are the most effective.

The amount of treatment should be at least one part per million of the corrosion-inhibiting chemical by weight of the produced vapors, preferably 1 to 5 parts per million, and even more preferably 10 to 25 parts per million. The dosage will, of course, vary depending on the conditions of the system and other variable factors and, hence, dosages as high as 50 to 100 parts per million may be necessary under extraordinarily corrosive conditions.

The employment of the corrosion-inhibiting chemicals in accordance with this invention is applicable to the generation of vapors from black liquors at various temperatures and pressures. Good results can be obtained where vapors are generated under atmospheric conditions, subatmospheric conditions, or superatmospheric conditions.

The substituted alkylene diamines which are used as starting materials in preparing the compositions useful in the practice of the invention have the following general formula:

FORMULA I

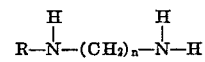

wherein R is an acyclic hydrocarbon radical containing from 10 to 32 carbon atoms and $n$ is an integer from 2 to 6.

The radical R is conveniently derived from a saturated or unsaturated fatty group. The radical R can be such groups as dodecyl, tetradecyl, hexadecyl, octadecyl, octadecenyl, and octadecadienyl with good results being obtained in each instance. Extremely good results are afforded when R is a mixture of alkyl radicals such as are found in vegetable oils and animal fats. Coco (from coconut oil), soya (from soya oil), and tallow are examples of such mixed natural radicals.

The diamine portion of the compounds described above may be one of any number of the known diamines. Ethylene diamine, 1,2-propylene diamine, 1,3-propylene diamine (trimethylene diamine), and hexamethylene diamine are several examples.

The substituted alkylene diamines may be prepared by several different techniques. For instance, the alkylene diamines may be alkylated with an alkyl halide to produce the desired product. Such a method is illustrated in Kyrides U.S. Patent 2,246,524. Another method is to react an alkylamine with acrylonitrile and then hydrogenate whereby an alkyl substituted trimethylene diamine is produced. Commercially available N-alkyl trimethylene diamines are the products manufactured by the Armour Chemical Division under the trade name "Duomeen." Specific Duomeens are N-lauryl trimethylene diamine; N-coco trimethylene diamine; N-soya trimethylene diamine; and N-tallow trimethylene diamine.

The substituted alkylene diamines thus described are capable of being reacted with varying amounts of several of the well-known low molecular weight alkylene oxides, such as ethylene oxide, 1,2-propylene oxide, butylene oxide, or the like to produce products varying in their physical and chemical properties. To be suitable for present purposes, the oxyalkylated substituted alkylene diamines must be water-dispersible to the extent that 5% by weight or more forms a uniform dispersion in aqueous media. This is usually accomplished by oxyalkylating one mole of diamine with 1–4 moles of ethylene oxide or other alkylene oxide to produce the degree of water dispersibility desired.

The oxyalkylation of the products may be performed by any one of several well-known methods. Since there are three reactive hydrogen atoms in the alkyl substituted diamines, the oxyalkylation could conceivably take place at any of the sites. Hence, one mole of an alkylene oxide could react with any one of the three hydrogen atoms to produce a mixture of oxyalkylated products.

The alkyl substituted trimethylene diamines, when reacted with 1–4 moles, and preferably 2–3 moles, of ethylene oxide have proven to be outstanding inhibitors. Several of these reaction products are listed below in Table I.

Table I

| Composition Number | Alkyl Substituted Trimethylene Diamine | Moles of Ethylene Oxide | Water Dispersible? | |
|---|---|---|---|---|
| | | | Yes | No |
| I | N-tallow trimethylene diamine | 3 | X | |
| II | ----do---- | 2 | X | |
| III | ----do---- | 1 | X | |
| IV | N-soya trimethylene diamine | 3 | X | |
| V | N-coco trimethylene diamine | 3 | X | |
| VI | N-lauryl trimethylene diamine | 4 | X | |
| VII | M-coco trimethylene diamine | 2 | X | |

In addition to the water-dispersible products of low molecular weight alkylene oxides and substituted alkylene diamines, certain aliphatic carboxylic acid salts of these compositions may also be employed. The salt-forming aliphatic carboxylic acids should not exceed 10 carbon atoms in chain length. For purposes of classification, the acids may be divided into four classes:

I. Aliphatic monocarboxylic acids
II. Aliphatic dicarboxylic acids
III. Hydroxy substituted monocarboxylic acids
IV. Hydroxy substituted polycarboxylic acids In class I, such acids as acetic, propionic, n-butyric isobutyric, n-heptylic, caprylic, and pelargonic acids may be used. Examples of class II are oxalic, malonic, succinic, glutaric, alipic, pimelic, suberic, azelaic, and sebacic acids. Glycolic and lactic acids are illustrative of class III. Class IV includes such acids as malic, citric, gluconic, and glyceric.

The salts, in some instances, have the property of making the reaction products more dispersible where dispersibility is an important consideration, and in some instances tend to render the products water-soluble. The salts will become dissociated from the oxyalkylated substituted amine reaction product during the process of being steam distilled under conditions of use. In certain cases, improved corrosion-inhibiting compositions are afforded by the salts of the reaction products.

For purposes of illustration, several aliphatic carboxylic acid salts of the alkyl substituted trimethylene diamines listed in Table I are shown below in Table II:

Table II

| Composition Number | Composition Number Table I | Aliphatic Carboxylic Acid | Molar Ratio Reaction Product: Acid |
|---|---|---|---|
| VIII | I | acetic acid | 1:1 |
| IX | I | lactic acid | 1:1 |
| X | I | citric acid | 1:1 |
| XI | III | butyric acid | 1:1 |
| XII | IV | malic acid | 1:1 |
| XIII | V | succinic acid | 1:1 |
| XIV | I | malonic acid | 2:1 |
| XV | I | adipic acid | 1:1 |

The salts listed in Table II were prepared by heating the compositions in Table I, which ranged from viscous liquids to pastes, and adding the acid, with continued heat, until a homogeneous product was produced.

When the compositions are to be used commercially, it is often desirable to prepare a formulated product using water as diluent. In order to insure such water dilutions against freezing and to provide a uniformly stable product, it is usually preferable to use a low molecular weight aliphatic alcohol as a co-solvent.

A typical formula was prepared having the following composition:

COMPOSITION XVI

| Components: | Percent by weight |
|---|---|
| Composition I, Table I | 20 |
| Isopropanol | 20 |
| Water | 60 |

The formula was prepared by dissolving Composition I, Table I, into the isopropanol and then adding the water. This produced a formulation that was cloudy, but homogeneous, and was stable on standing at 10° F., 70° F., and 120° F. for 24 hours. It could be readily dispersed in water, at concentrations up to 50% by weight with only moderate stirring. Such dispersions remained homogeneous after standing for several days at room temperature. While it is good practice to dissolve the oxyalkylated substituted diamine reaction product into the alcohol before adding the water, the formulation may be prepared by using any mixing order with good formulas being produced.

The following examples will further illustrate the invention.

EXAMPLE I

The system consisted of six evaporators in series, all constructed of steel, with 40 pounds of steam fed to the No. 1 evaporator. The steam produced in each evaporator is fed to the next evaporator, thus producing successive pressures of 20 pounds and 4 pounds in evaporators 1 and 2 respectively, and vacuums of $-5''$, $-14''$, $-20''$, and $-26''$ of mercury in evaporators 3 through 6 respectively. The liquors produced in the last evaporator are drained off by means of stainless steel condenser tubes. A $3/16''$ thick deposit was noted in the steel steam line leading from evaporator No. 5 to evaporator No. 6. Gravimetric analysis of a sample of this scale revealed it to have a loss on ignition of from 22% to 35%, and an iron oxide content (expressed as $Fe_2O_3$) of 55% to 75%. Fifteen parts per million of Composition XVI was fed at the steam line leading from evaporator No. 5 to evaporator No. 6. After treatment had been continued for a period of three months, the tube was again examined for deposit. The amount of deposit was decreased, and what deposit existed was soft, fluffy, and easily removed. It was concluded, therefore, that the corrosion inhibition of the invention lessened scale deposition to a remarkable degree and that corrosion was substantially mitigated.

EXAMPLE II

Composition XVI was fed continuously to the vapor side of each of the first five stages of a typical six-stage evaporator system. After two weeks, it was noted that throughput had increased by 50 to 60 gallons per minute and that the discharged liquor had a Baumé of 0.5° to 1.0° higher than from the untreated evaporator system. From this information, it was concluded that the use of the corrosion inhibiting composition of the invention showed a measurable and valuable effect.

In addition to feeding the treatment at the point where the vapors are produced or in the steam lines, it is also possible to feed the treatment directly to the black liquor being evaporated. When fed at this point, the compositions will react with the vapors formed at the interface above the boiling liquid and will be entrained in and with the corrosive vapors. When the black liquor is treated, slightly excessive amounts should be used since minor amounts of the treatment chemical will be retained in the liquid phase of the system.

The invention is effective in reducing corrosion to normally corrodible metal surfaces of equipment made of ferrous metals such as iron and steel or non-ferrous metals such as, for example, brass which are or may be exposed to black liquor vapors during evaporation, condensation, transportation, concentration or other chemical and physical processing of black liquors.

The invention is hereby claimed as follows:

1. A method of inhibiting corrosion of metal surfaces in a multiple effect black liquor evaporator system that are corrodible by black liquor vapors in the processing of black liquors which comprises feeding the dilute black liquor into said system, volatilizing the liquid components of the liquor and adding to the black liquor vapors during the concentration from 1 to 100 parts per million of a composition from the group consisting of oxyalkylated alkylene diamines containing a single long aliphatic hydrocarbon chain having at least 10 carbon atoms attached to one of the nitrogen atoms and oxyalkylated with a lower alkylene oxide to link oxyalkylene groups to at least one of the nitrogen atoms to the extent that at least 5% by weight of said oxyalkylated diamine is water dispersible, and the salts of said oxyalkylated diamines with aliphatic carboxylic acids containing less than 10 carbon atoms from the group consisting of aliphatic monocarboxylic acids, aliphatic dicarboxylic acids, hydroxy aliphatic monocarboxylic acids, and hydroxy aliphatic polycarboxylic acids, said compounds being further characterized by the fact that the initial alkylene diamines prior to oxyalkylation contain 2 to 6 carbon atoms connecting the amino nitrogen atoms, and concentrating said black liquor.

2. A method of inhibiting corrosion of metal surfaces in a multiple effect black liquor evaporator system that are corrodible by black liquor vapors in the processing of black liquors which comprises feeding the dilute black liquor into said system, volatilizing the liquid components of the liquor and adding to the black liquor vapors during the concentration from 1 to 100 parts per million of an oxyalkylation reaction product of from 1 to 4 moles of a lower alkylene oxide and an alkylene diamine of the formula $$R-\underset{|}{\overset{H}{N}}-(CH_2)_n-\underset{|}{\overset{H}{N}}-H$$

wherein R is an acyclic hydrocarbon radical containing from 10 to 32 carbon atoms and $n$ is an integer from 2 to 6, said alkylene diamine being oxyalkylated with said lower alkylene oxide to the extent that at least 5% by weight of the resultant oxyalkylated diamine is water dispersible, and concentrating said black liquor.

3. A method of inhibiting corrosion of metal surfaces in a multiple effect black liquor evaporator system that are corrodible by black liquor vapors in the processing of black liquors which comprises feeding the dilute black liquor into said system, volatilizing the liquid components of the liquor and adding to the black liquor vapors during the concentration from 1 to 100 parts per million of an oxyethylation reaction product of from 1 to 4 moles of ethylene oxide and an alkylene diamine of the formula $$R-\underset{|}{\overset{H}{N}}-(CH_2)_n-\underset{|}{\overset{H}{N}}-H$$

wherein R is a mixture of acyclic hydrocarbon radicals normally occurring in vegetable oils and fats and $n$ is an integer from 2 to 3, said alkylene diamine being oxyethylated to the extent that at least 5% by weight of the resultant oxyethylated diamine is water dispersible, and concentrating said black liquor.

4. A method of inhibiting corrosion of metal surfaces in a multiple effect black liquor evaporator system that are corrodible by black liquor vapors in the processing of black liquors which comprises feeding the dilute black liquor into said system, volatilizing the liquid components of the liquor and adding to the black liquor vapors during the concentration a corrosion inhibiting amount of at least 1 part per million of the reaction product of 3 moles of ethylene oxide and N-tallow trimethylene diamine, and concentrating said black liquor.

5. A method of inhibiting corrosion of metal surfaces in a multiple effect black liquor evaporator system that are corrodible by black liquor vapors in the processing of black liquors which comprises feeding the dilute black liquor into said system, volatilizing the liquid components of the liquor and adding to the black liquor vapors during the concentration from 1 to 100 parts per million of an aliphatic carboxylic acid salt of an oxyalkylation reaction product of from 1 to 4 moles of a lower alkylene oxide and an alkylene diamine of the formula $$R-\underset{|}{\overset{H}{N}}-(CH_2)_n-\underset{|}{\overset{H}{N}}-H$$

wherein R is an acyclic hydrocarbon radical containing from 10 to 32 carbon atoms; $n$ is an integer from 2 to 6; and the salt-forming aliphatic carboxylic acid is from the group consisting of aliphatic monocarboxylic, aliphatic dicarboxylic, hydroxy aliphatic monocarboxylic, and hydroxy aliphatic polycarboxylic acids containing not more than 10 carbon atoms, said salt being water dispersible to the extent of at least 5% by weight, and concentrating said black liquor.

6. A method of inhibiting corrosion of metal surfaces of a multiple effect black liquor evaporator system that are corrodible by black liquor vapors in the processing of black liquors which comprises feeding the dilute black liquor into said system, volatilizing the liquid components of the liquor and adding to the black liquor vapors during the concentration from 1 to 100 parts per million of an aliphatic carboxylic acid salt of an oxyethylation reaction product of from 1 to 4 moles of ethylene oxide and an alkylene diamine of the formula $$R-\underset{|}{\overset{H}{N}}-(CH_2)_n-\underset{|}{\overset{H}{N}}-H$$

where R is a mixture of acyclic hydrocarbon radicals normally occurring in vegetable oils and fats; $n$ is an integer from 2 to 3; and the salt-forming aliphatic carboxylic acid is from the group consisting of aliphatic monocarboxylic, aliphatic dicarboxylic, hydroxy aliphatic monocarboxylic, and hydroxy aliphatic polycarboxylic acids containing not more than 10 carbon atoms, said salt being water dispersible to the extent of at least 5% by weight, and concentrating said black liquor.

7. A method of inhibiting corrosion of metal surfaces in a multiple effect black liquor evaporator system that are corrodible by black liquor vapors in the processing of black liquors which comprises feeding the dilute black liquor into said system, volatilizing the liquid components of the liquor and adding to the black liquor vapors during the concentration a corrosion inhibiting amount of at least one part per million of the acetic acid salt of the reaction product of 3 moles of ethylene oxide and N-tallow trimethylene diamine, and concentrating said black liquor.

8. In a process for evaporating black liquor in a multiple effect evaporating system of the type comprising a plurality of series-connected ferrous metal evaporators for successively concentrating dilute black liquor, each evaporator comprising a single effect, with the first effect containing the most concentrated black liquor and the last effect containing the most dilute black liquor, means for heating the first effect to temperatures which produce steam under super atmospheric pressures, means for countercurrently transferring the generated steam from the first effect through the series of evaporators to the last effect, and whereby said generated steam is utilized for heating the dilute black liquors; the improvement which comprises the steps of adding to said last effect from 1 to 100 parts per million of a compound from the group consisting of oxyalkylated alkylene diamines containing a single long aliphatic hydrocarbon chain having at least 10 carbon atoms, attached to one of the nitrogen atoms the oxyalkylation having been with a lower alkylene oxide to link oxyalkylene groups to at least one of the nitrogen atoms to the extent that at least 5% by weight of said oxyalkylated diamine is water dispersible, and the acid addition salts of said oxyalkylated diamines, with aliphatic carboxylic acids containing less than 10 carbon atoms from the group consisting of aliphatic monocarboxylic acids, aliphatic dicarboxylic acids, hydroxy aliphatic monocarboxylic acids, and hydroxy aliphatic polycarboxylic acids, said compound being further characterized by the fact that the initial alkylene diamines prior to oxyalkylation contain 2 to 6 carbon atoms connecting the amino nitrogen atoms, whereby the ferrous metals of the multiple effect evaporator exposed to the corrosive steam vapors of all the effects are rendered substantially non-corrosive, transferring said concentrate to the next effect and successively repeating the concentrations and additions of said chemicals until the black liquor concentrate is withdrawn from the first effect.

9. The process of claim 8 wherein the chemical composition added is an oxyalkylation reaction product of from 1 to 4 moles of a lower alkylene oxide per mole of an alkylene diamine of the formula $RNH(CH_2)_nNH_2$, wherein R is an acyclic hydrocarbon radical containing from 10 to 32 carbon atoms and $n$ is an integer from 2 to 6, said alkylene diamine being oxyalkylated with said lower alkylene oxide to the extent that at least 5% by weight of the resultant oxyalkylated diamine is water dispersible.

10. The process of claim 8 wherein the chemical composition added is an oxyethylation reaction product of from 1 to 4 moles of ethylene oxide per mole of an alkylene diamine of the formula $RNH(CH_2)_nNH_2$, wherein R is a mixture of acyclic hydrocarbon radicals normally occurring in vegetable oils and fats and $n$ is an integer from 2 to 3, said alkylene diamine being oxyethylated to the extent that at least 5% by weight of the resultant oxyethylated diamine is water dispersible.

11. The process of claim 8 wherein the chemical composition added is the reaction product of 3 moles of ethylene oxide per mole of N-tallow trimethylamine.

12. The process of claim 8 wherein the chemical composition is added directly to the vapor phase of the multiple effect evaporator system.

References Cited in the file of this patent

UNITED STATES PATENTS

| | | |
|---|---|---|
| 2,857,330 | Hall | Oct. 21, 1958 |
| 2,889,276 | Barrett et al. | June 2, 1959 |